United States Patent
Kondziella et al.

(10) Patent No.: US 10,533,692 B2
(45) Date of Patent: Jan. 14, 2020

(54) HEATABLE MEDIA LINE

(71) Applicant: A. KAYSER AUTOMOTIVE SYSTEMS GMBH, Einbeck (DE)

(72) Inventors: Klaus Kondziella, Einbeck (DE); Heiko Freter, Einbeck (DE); Gerhard Müller-Riederer, Bretzfeld (DE)

(73) Assignee: A. KAYSER AUTOMOTIVE SYSTEMS GMBH, Einbeck (DE)

( * ) Notice: Subject to any disclaimer, the term of this patent is extended or adjusted under 35 U.S.C. 154(b) by 427 days.

(21) Appl. No.: 15/405,352

(22) Filed: Jan. 13, 2017

(65) Prior Publication Data

US 2017/0198853 A1    Jul. 13, 2017

(30) Foreign Application Priority Data

Jan. 13, 2016   (DE) .......................... 10 2016 000 192

(51) Int. Cl.
*H05B 3/40* (2006.01)
*F16L 53/38* (2018.01)
*F01N 3/20* (2006.01)
*H01R 13/52* (2006.01)

(52) U.S. Cl.
CPC ............. *F16L 53/38* (2018.01); *F01N 3/2066* (2013.01); *H01R 13/521* (2013.01); *H01R 13/5227* (2013.01); *F01N 2610/10* (2013.01)

(58) Field of Classification Search
CPC ............... H05B 1/0227; H05B 1/0236; H05B 1/0244–0247; H05B 3/40; H05B 3/44; H05B 3/50; H05B 3/58; F16L 11/12; F16L 53/30; F16L 53/35–38
See application file for complete search history.

(56) References Cited

U.S. PATENT DOCUMENTS

| | | | |
|---|---|---|---|
| 2007/0176418 A1* | 8/2007 | Frogneborn | F16L 53/38 138/103 |
| 2010/0253067 A1* | 10/2010 | Isenburg | F16L 53/38 285/41 |
| 2010/0263740 A1* | 10/2010 | Borgmeier | F16L 53/38 137/341 |
| 2012/0291904 A1* | 11/2012 | Eckardt | F16L 53/38 138/109 |

(Continued)

FOREIGN PATENT DOCUMENTS

DE    102014004134 A1    9/2015

*Primary Examiner* — Michael A Laflame, Jr.
(74) *Attorney, Agent, or Firm* — Fox Rothschild LLP

(57) ABSTRACT

A heatable media line includes a connecting part, which establishes an electrical connection, and serves to introduce a heat conductor into a media line section. A connection of the heat conductor with contact-forming parts is set up in an end part, and the heat conductor is tightly accommodated in boreholes of a coupling part by means of two sealing bodies spaced apart from each other, as well as introduced into the media line section by way of a supporting body for purposes of heating a medium flowing in the latter. In order to produce a reliable seal intended to prevent the medium from penetrating into the end part, recesses in the walls of the coupling part and an interruption of a creepage distance are configured between the sealing bodies such that the heat conductor is directly in contact with the surrounding atmosphere.

23 Claims, 4 Drawing Sheets

(56) References Cited

U.S. PATENT DOCUMENTS

| | | | |
|---|---|---|---|
| 2014/0230941 A1* | 8/2014 | De Beer | F16L 53/38 |
| | | | 138/33 |
| 2015/0144217 A1* | 5/2015 | Reusche | F16L 53/38 |
| | | | 138/33 |
| 2017/0227145 A1* | 8/2017 | Green | F16L 59/021 |
| 2018/0023767 A1* | 1/2018 | Delaunay | E21B 36/04 |
| | | | 138/33 |
| 2018/0124876 A1* | 5/2018 | Diebolt | H05B 3/58 |
| 2018/0306460 A1* | 10/2018 | Weir | F24F 7/02 |

* cited by examiner

HEATABLE MEDIA LINE

BACKGROUND

The invention relates to a heatable media line.

Heated media lines in the vehicle sector often involve diesel exhaust fluied (e.g., AdBlue®) lines, lines for windshield washer fluid, headlamp washer fluid, process media of a fuel cell, etc., i.e., lines intended for carrying a medium, in which freezing must be prevented with an eye toward internal combustion engine operation and driving comfort. However, the urea solution used in tanks as a fuel additive and known by the name AdBlue® freezes at −11° C., and thus must always be heated during winter operation. In order to ensure flawless vehicle operation under all expected operating temperatures, the tanks, lines and other components carrying the respective medium at risk of freezing must be heated.

Known from DE 10 2014 004 134 A1 is a heatable media line for a vehicle, which consists of an upper part and a cylindrical lower part that acts as a coupling piece and establishes a connection between the opposing ends of two media lines. There are welded connections between the upper part and lower part, as well as between the lower part and media lines. The upper part is provided with two passages that each incorporate a connecting cable, wherein the electrical attachment points designed as crimping connections sealed by a melt adhesive between the connecting cables and the heat conductors extending inside the media lines and into the filler body are accommodated inside of the upper part otherwise filled with a filler body made out of a plastic. The heat conductors are centrally guided inside of the media lines in the form of a closed loop, so that given a uniform all-around heating, the flow of a medium in the lines is not impaired. The heat conductors are tightly introduced into the upper part by means of packing washers and upper side end caps spaced apart therefrom, which leave an uncovered, free region.

It has been determined that a urea solution in the form of the mentioned AdBlue® medium, which involves an aqueous solution of highly pure urea in demineralized water, is especially able to creep due to its low viscosity, so that special measures are required to establish a reliable seal, in order to prevent this extremely corrosively acting medium from undesirably spreading. In particular, penetration into parts of an electrical connection must be prevented with an eye toward avoiding electrical short circuits.

SUMMARY

The object of the invention is to equip a heatable media line of the kind designated at the outset with an improved seal.

In accordance with one aspect of the disclosure, a free region not covered by the sealing bodies be set up along the heat conductor(s), specifically between two sealing bodies enveloping the latter, which interrupts a creepage distance between the interior sides of the sealing bodies and the exterior sides of the heat conductors. This free region has a free space allocated to it, in which the medium that penetrated through the first sealing body owing to creepage can exit. Such a free region or even a plurality of such free regions can be set up along the heat conductor/heat conductors. In all of these cases, the underlying idea involves setting up interruptions in the form of free regions in the progression of the creepage distance, which receives the medium that overcame the creepage distance section defined by the preceding sealing body, thereby in any event at least hampering any penetration of a sealing arrangement defined in this way as the result of creepage.

This free region between two sealing bodies is continuously connected with the surrounding atmosphere. This makes it possible to discharge the medium into the environment once it has defeated a sealing body through creepage. A further configuration of this principle can provide that the exiting medium be collected or passed along for organized disposal.

Other aspects of the disclosure are geared toward the constructive assembly of the connecting part, which consists of three parts inserted into each other on their respective facing sides, specifically a connecting element, a coupling piece and an end part. For example, a welded connection exists between these parts in the insertion position, wherein the coupling piece simultaneously carries out the function of a filler body, which accommodates the boreholes set up to receive the heat conductor(s), including the sealing bodies enveloping the latter. However, other types of fixed connections between these parts are not ruled out. The plug or assembly positions of these parts are further created on the understanding that a free section comes about between the facing sides of the end part and connecting part, which thus can be accessed from an exterior side.

The sealing bodies are profiled on the exterior side according to another aspect of the disclosure, thereby resulting in an optimal sealing effect between the exterior sides of this sealing body and the facing interior sides of the boreholes.

In order to unilaterally fix the assembly position of the sealing bodies, the boreholes receiving them exhibit a taper on their facing ends according to an additional aspect.

In order to fabricate a continuous connection between the free region of the heat conductor and the surrounding atmosphere, the coupling piece exhibits at least two recesses according to other aspects of the disclosure, through which a medium that has defeated the creepage distance established by the preceding sealing bodies can be discharged, so as to prevent it from penetrating as far as the end part due to a continuing creepage process, which defeats even the next creepage distance, and there triggering an electrical short circuit.

The advantage to additional aspects of the disclosure are that a correct assembly state of the sealing bodies can be recognized on the exterior side by the fact that their ends protrude slightly from the boreholes. This can be visually discerned from the exterior side of the coupling piece by way of the recesses, and is achieved by the tapering configuration at one end of the boreholes receiving the sealing bodies in conjunction with a profiling on the exterior side of the sealing bodies, which in particular in conjunction with the tapering configuration of the boreholes only allows the sealing bodies to be inserted in one orientation.

A supporting body according other aspects of the dislosure serves to center the heat conductor(s) inside of the connecting element.

According to additional aspects, such a supporting body can further be used to place a sealing body under a mechanical prestress. The sealing body can exhibit a tapering end, which due to this prestress is pushed into the tapering end of the borehole allocated thereto, thereby bringing with it another sealing effect resembling that exerted by a stuffing box.

In a comparable manner, the other sealing body can also be placed under a mechanical pre-stress.

As evident based on the above explanations, the present media line provides a heatable line for media having an extraordinary ability to creep, which exhibits a simple structure and provides a reliable seal for an interface between live parts of a connecting part by comparison to the mentioned medium.

BRIEF DESCRIPTION OF THE DRAWINGS

The invention will be explained in more detail below with reference to the exemplary embodiment schematically depicted in the drawings. Shown on.

DETAILED DESCRIPTION

Figure 1:
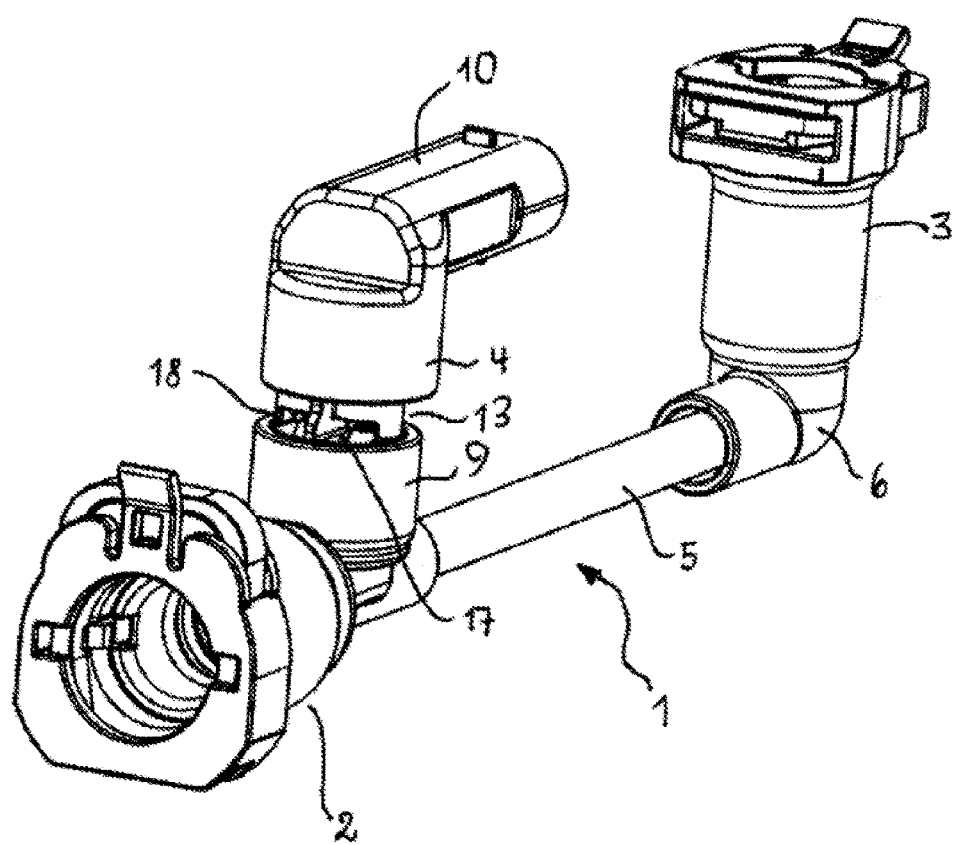
FIG. 1 is a perspective view of a line element according to the invention.

Exemplarily marked 1 on FIG. 1 is a heatable, angled line element, which includes coupling pieces 2, 3 on the end sides, a connecting part 4 intended to be connected with a voltage source, a straight media line section 5 and an elbow 6.

The coupling pieces 2, 3 are intended for use in a known manner for establishing a connection with adjoining line sections, but this will not be discussed in any more detail below.

The connecting part 4 serves to establish an electrical connection between an outer voltage source and a heat conductor (not depicted on FIGS. 1 and 2) guided inside the media line section 5 with the assistance of spacers, which can be arranged in the form of a closed loop. In the exemplary embodiment shown, the connecting part 4 can comprise a structural unit with the coupling piece 2.

The connections between the coupling pieces 2, 3, the connecting part 4 and the media line section 5 can be fabricated by welding.

Figure 2:
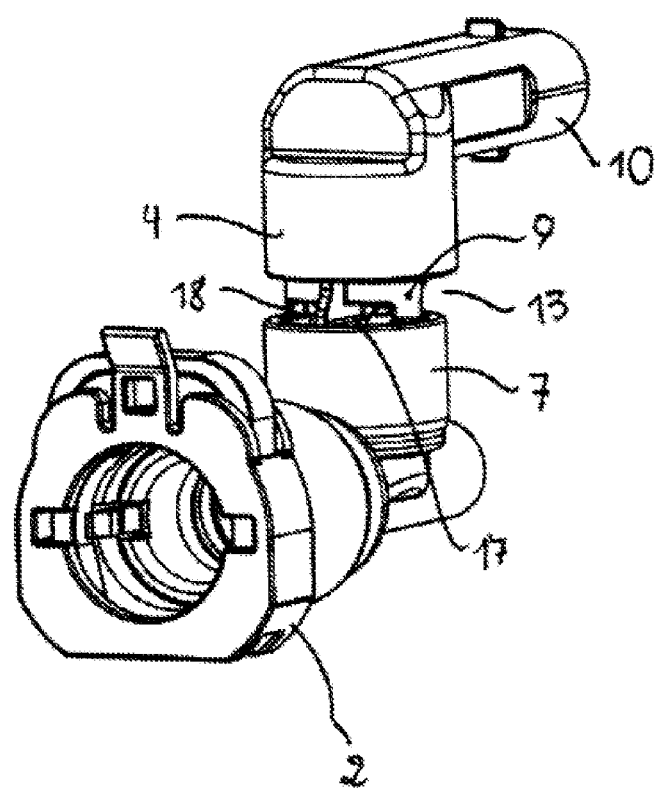
FIG. 2 is a perspective partial view of the line element according to FIG. 1.
Figure 3:
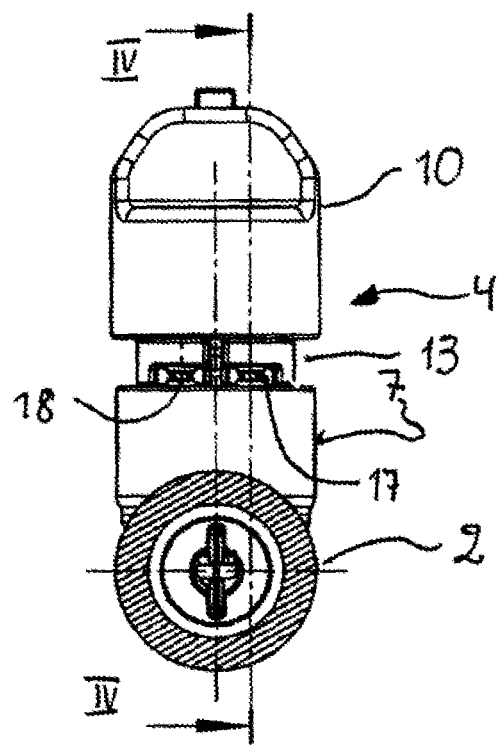
FIG. 3 is a planar view of a line element according to the invention as seen from viewing direction III on FIG. 4.
Figure 4:
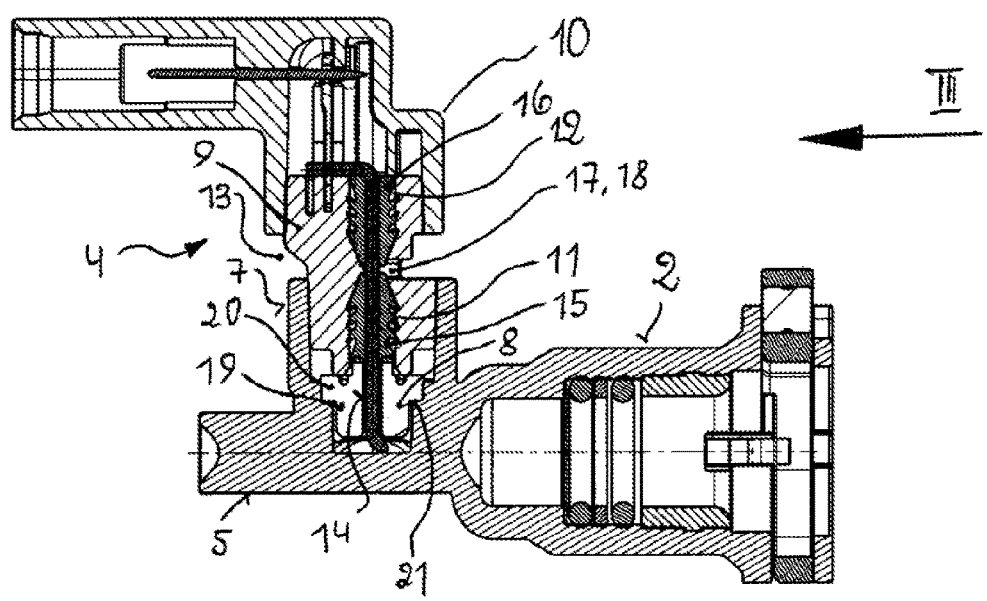
FIG. 4 is a view of the line element according to a sectional plane IV-IV on FIG. 3.

FIGS. 2 to 4 show correspondingly labeled functional elements corresponding to those on FIG. 1, thus eliminating the need for a repeated description in this regard.

The connecting part 4 consists of a cylindrical connecting element 7, which branches from the media line 5 in the form of a T and is continuously connected with the media line 5 via a lower opening 8, a coupling piece 9 inserted into the end facing away from the media line 5, and an end part 10 that establishes an electrical interface.

The coupling piece 9 is provided with a first central borehole 11 that tapers in its upper section and extends parallel to the axis of the connecting element 7, and a central second borehole 12 that tapers in a lower section and extends coaxially to the borehole 11. The coupling piece 9 is inserted into the connecting element 7 and end part 10 with the understanding that it can be freely accessed at least partially from the outside in a roughly central section 13.

Marked 19 is a supporting body, which is supported on an interior, annular supporting surface 21 of the connecting element 7 by way of an annular flange 20, and on which rests the coupling piece 9. This supporting body 19 fixes the insertion position of the coupling piece 9 inside of the connecting element 7 axially in the direction toward the media line section 5.

A connection can be set up between the connecting element 7, the coupling piece 9 and the end part 10 in basically any manner familiar to the expert, thus eliminating the need for any more detailed explanations in this regard.

Marked 14 is a heat conductor, which starts from the end part 10, and extends through the coupling piece 9, in particular the boreholes 11, 12 as well as the supporting body 19, and into the media line section 5. The heat conductor 14 runs inside of the media line section 5, thereby forming a radially supported loop in a known manner. In addition, the supporting body 19 sets up a central guide for the heat conductor(s) 14 inside of the connecting element 7.

A sealing body 15 profiled on the exterior side is inserted into the borehole 11 from a lower side, tightly enveloping the heat conductor, and protrudes slightly from the borehole 11 in the area of section 13. A sealing body 16 profiled on the exterior side is inserted into the borehole 12 from an upper side, tightly enveloping the heat conductor, and protrudes slightly from the borehole 12 in the area of section 13.

The supporting body 19 is arranged in such a way as to abut against the facing side of the sealing body, thereby placing the latter under a mechanical pre-stress in the direction toward the tapering section of the borehole. In this way, the sealing effect of a stuffing box is established in addition to the exterior profiling of the sealing body 15.

The coupling piece 9 exhibits two recesses 17, 18 in the section 13, specifically in the region in which the ends of the sealing bodies 15, 16 lie opposite each other spaced a distance apart. Set up at this location is a free region of the heat conductor(s), which is not taken up by a sealing body 15, 16, and also not by parts of the coupling piece 9. As a consequence, this location has a continuous connection between the heat conductor 14/heat conductors 14 and the surrounding atmosphere.

Inside of the end part 10, the heat conductor 14 is connected in a known manner with contact-imparting elements, wherein elements of a plug connection are involved, for example, with which a connection to an external voltage source can be established.

As a consequence, should creepage of the medium take place in the media line section 5, defeating the supporting body 19 and sealing body 15 in the process, the recesses 17, 18 in contact with the surrounding atmosphere, which interrupt a creepage distance in the direction toward the internal space of the end part 10, ensures that the medium that advanced in the free region of the heat conductor 14 can be discharged via the recesses 17, 18, so that further creepage cannot take place over the adjoining sealing body 16 in the direction toward live electrical parts inside of the end part 10, thereby potentially triggering an electrical short circuit.

| Reference List: | |
|---|---|
| 1. | Line element |
| 2. | Coupling piece |
| 3. | Coupling piece |
| 4. | Connecting part |
| 5. | Media line section |
| 6. | Elbow |
| 7. | Connecting element |
| 8. | Opening |
| 9. | Coupling piece |
| 10. | End part |
| 11. | Borehole |
| 12. | Borehole |
| 13. | Section |
| 14. | Heat conductor |
| 15. | Sealing body |

-continued

| Reference List: | |
|---|---|
| 16. | Sealing body |
| 17. | Recess |
| 18. | Recess |
| 19. | Supporting body |
| 20. | Annular flange |
| 21. | Supporting surface |

The invention claimed is:

1. A heatable media line comprising:
a media line section;
a connecting link for a connection part, wherein the connecting link comprises an electrical connection for at least one heat conductor incorporated within the media line section, further wherein the at least one heat conductor is accommodated within the connecting part by boreholes in a coupling piece, the boreholes accommodating at least two sealing bodies longitudinally spaced apart from each other so as to form at least one recess within the coupling piece between respective facing ends of the at least two sealing bodies such that a free region is formed along a portion of the at least one heat conductor proximate the at least one recess, the free region of the at least one heat conductor being continuously in contact with a surrounding atmosphere.

2. The heatable media line according to claim 1, wherein the connecting part comprises a connecting element directly coupled with the media line section, an end part configured for accommodating elements that impart an electrical contact, and wherein the connecting element and end part are configured to accommodate the coupling piece containing the at least two sealing bodies.

3. The heatable media line according to claim 2, wherein the coupling piece is inserted into respective ends of the connecting element and the end part, thereby leaving a free section between the connecting element and the end part, and otherwise forming a filler body inside the connecting element and the end part.

4. The heatable media line according to claim 1, wherein the at least two sealing bodies are profiled on an exterior side of said sealing bodies.

5. The heatable media line according to claim 1, wherein the boreholes include a tapering section on respective ends of the boreholes facing the free region of the at least one heat conductor.

6. The heatable media line according to claim 2, wherein the coupling piece comprises at least two recesses for establishing a connection between the free region of the at least one heat conductor and the surrounding atmosphere.

7. The heatable media line according to claim 6, wherein the respective ends of the boreholes facing the at least two recesses each include a section that tapers in a direction toward each respective end, and further wherein an exterior profile of the at least two sealing bodies is configured such that the at least two sealing bodies can only be inserted into the boreholes in one direction.

8. The heatable media line according to claim 1, further comprising a supporting body, wherein the supporting body is situated in a transitional area between the connecting part and the media line section, and further wherein the supporting body is configured to centrally guide the at least one heat conductor.

9. The heatable media line according to claim 8, wherein the supporting body is dimensioned and inserted into the connecting part such that the sealing body nearest the connecting element is placed under a mechanical pre-stress in a direction toward the tapering section of the borehole nearest the connecting element.

10. The heatable media line according to claim 2, wherein the at least two sealing bodies are profiled on an exterior side of said sealing bodies.

11. The heatable media line according to claim 3, wherein the at least two sealing bodies are profiled on an exterior side of said sealing bodies.

12. The heatable media line according to claim 2, wherein the boreholes include a tapering section on their respective ends facing the free region of the at least one heat conductor.

13. The heatable media line according to claim 3, wherein the boreholes include a tapering section on their respective ends facing the free region of the at least one heat conductor.

14. The heatable media line according to claim 4, wherein the boreholes include a tapering section on their respective ends facing the free region of the at least one heat conductor.

15. The heatable media line according to claim 3, wherein the coupling piece is provided with at least two recesses for establishing a connection between the free region of the at least one heat conductor and the surrounding atmosphere.

16. The heatable media line according to claim 4, wherein the coupling piece is provided with at least two recesses for establishing a connection between the free region of the at least one heat conductor and the surrounding atmosphere.

17. The heatable media line according to claim 5, wherein the coupling piece is provided with at least two recesses for establishing a connection between the free region of the at least one heat conductor and the surrounding atmosphere.

18. The heatable media line according to claim 15, wherein the respective ends of the boreholes facing the at least two recesses each include a section that tapers in a direction toward each respective end, and further wherein an exterior profile of the at least two sealing bodies is configured such that the at least two sealing bodies can only be inserted into the boreholes in one direction.

19. The heatable media line according to claim 2, further comprising a supporting body, wherein the supporting body is situated in a transitional area between the connecting part and the media line section, and further wherein the supporting body is configured to centrally guide the at least one heat conductors.

20. The heatable media line according to claim 3, further comprising a supporting body, wherein the supporting body is situated in a transitional area between the connecting part and the media line section, and further wherein to the supporting body is configured to centrally guide the at least one heat conductor.

21. The media line according to claim 4, further comprising a supporting body, wherein the supporting body is situated in a transitional area between the connecting part and the media line section, and further wherein to the supporting body is configured to centrally guide the at least one heat conductor.

22. The media line according to claim 5, further comprising a supporting body, wherein the supporting body is situated in a transitional area between the connecting part and the media line section, and further wherein to the supporting body is configured to centrally guide the at least one heat conductor.

23. The media line according to claim 6, further comprising a supporting body, wherein the supporting body is situated in a transitional area between the connecting part and the media line section, and further wherein to the supporting body is configured to centrally guide the at least one heat conductor.

\* \* \* \* \*